US008810180B2

(12) United States Patent
Schmidt

(10) Patent No.: US 8,810,180 B2
(45) Date of Patent: Aug. 19, 2014

(54) ELECTRIC MOTOR OPERATION APPARATUS AND METHOD

(75) Inventor: Franz-Josef Schmidt, Salzkotten (DE)

(73) Assignee: Zentrum Mikroelektronik Dresden AG, Dresden (DE)

( * ) Notice: Subject to any disclaimer, the term of this patent is extended or adjusted under 35 U.S.C. 154(b) by 658 days.

(21) Appl. No.: 13/125,585

(22) PCT Filed: Oct. 21, 2009

(86) PCT No.: PCT/EP2009/063787
§ 371 (c)(1),
(2), (4) Date: Dec. 22, 2011

(87) PCT Pub. No.: WO2010/046386
PCT Pub. Date: Apr. 29, 2010

(65) Prior Publication Data
US 2012/0086376 A1    Apr. 12, 2012

(30) Foreign Application Priority Data

Oct. 23, 2008   (DE) .......................... 10 2008 052 933

(51) Int. Cl.
*H02P 6/18* (2006.01)
(52) U.S. Cl.
CPC ..................................... *H02P 6/182* (2013.01)
USPC ........... 318/400.35; 318/400.34; 318/400.32; 318/400.01; 318/700
(58) Field of Classification Search
CPC ..................................... H02P 6/182
USPC ............. 318/400.35, 400.34, 400.32, 400.01, 318/700
See application file for complete search history.

(56) References Cited

U.S. PATENT DOCUMENTS 5,334,917 A * 8/1994 Lind .................... 318/400.35
5,552,685 A * 9/1996 Young et al. ............ 318/400.32
5,821,722 A * 10/1998 Forbes et al. .................. 318/696
6,034,493 A    3/2000 Boyd et al.
6,838,847 B2   1/2005 Dragoi et al.
7,288,911 B2 * 10/2007 MacKay .................. 318/400.21
2010/0019710 A1   1/2010 Schwarzkopf et al.

FOREIGN PATENT DOCUMENTS

| DE | 102006032491 A1 | 1/2008 |
| DE | 102008052933.8 | 10/2008 |
| EP | 1136828 A2 | 3/2001 |
| EP | 1267479 A1 | 6/2001 |
| WO | 2010046386 | 4/2010 |

OTHER PUBLICATIONS

International Search Report, PCT/EP2009/063787 (Apr. 6, 2010).

* cited by examiner

*Primary Examiner* — David Luo
(74) *Attorney, Agent, or Firm* — Husch Blackwell LLP

(57) ABSTRACT

A method for operating an electric motor with primary and secondary sections, wherein the primary section has a multiphase exciter winding, each of the phase connections of said exciter winding being connected to an output connection of an end stage, which has controllable semi-conductor switches for applying phase voltages to the output connections, includes the following steps: a) introducing an operating phase by applying the phase voltages to the output connections such that a moving magnetic field is induced in the exciter winding, the moving field effecting a relative motion between the primary and secondary sections, b) hinting off the phase voltage at least one of the output connections to introduce a measurement phase, and c) measuring the electrical back emf induced in the winding strand in order to determine the angular difference between the phase position of the exciter current and that of the back emf.

17 Claims, 3 Drawing Sheets

ELECTRIC MOTOR OPERATION APPARATUS AND METHOD

Figure 1:
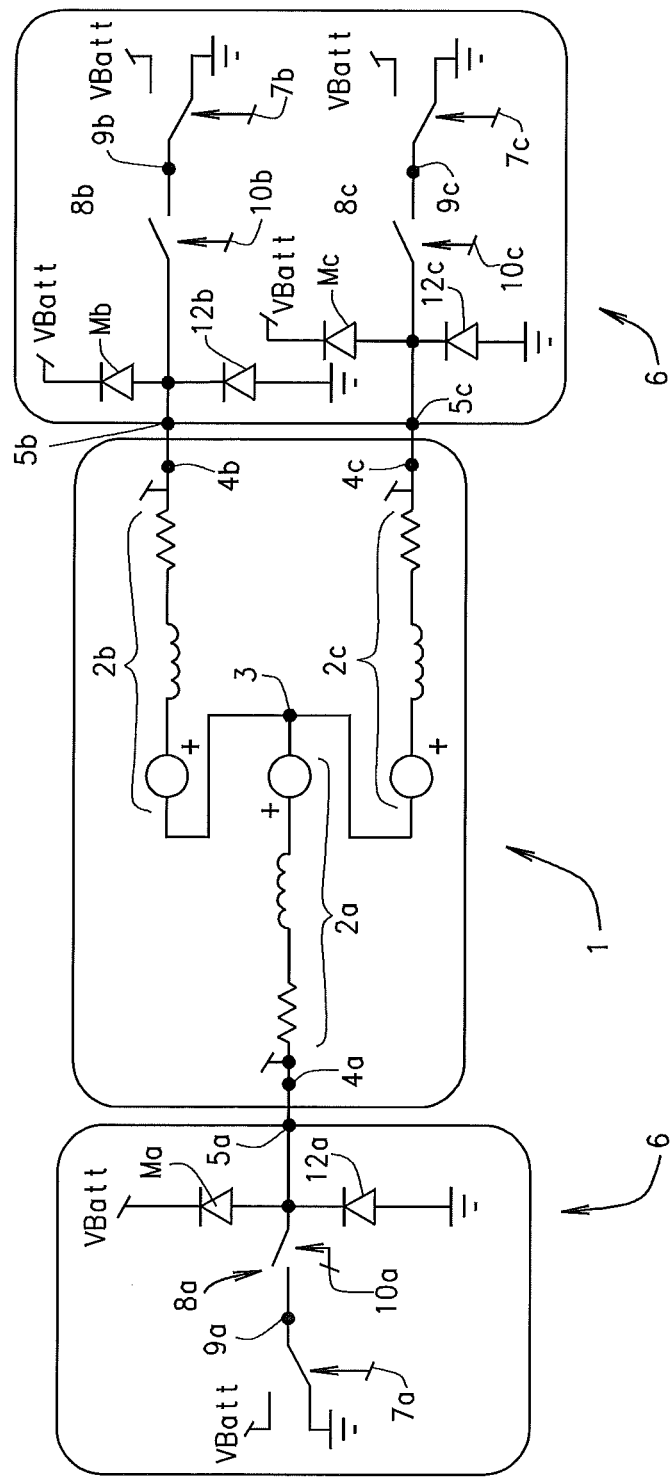

The invention relates to a method for operating an electric motor, which has a primary part and a secondary part, the primary part having a polyphase field winding having winding phases, the phase terminals of said field winding each being connected to an output terminal of an output stage, the output stage having controllable semiconductor switches for applying phase voltages to the output terminals, said method comprising the following steps:

a) introducing an operating phase by applying the phase voltages to the output terminals of the output stage in such a way that a traveling magnetic field is induced in the field winding which causes a relative movement between the primary part and the secondary part,
b) disconnecting the phase voltage at least one of the output terminals in order to introduce a measurement phase,
c) measuring the electrical back-emf which is induced in the winding phase connected to this output terminal as a result of the relative movement between the primary and secondary parts in order to determine the angular difference between the phase angle of the field current and that of the back-emf,
d) possibly repeating steps a) to c).

Such a method is known from WO 2007/026241 A2. In this case, electrical phase voltages are applied to the field winding via the output terminals of the output stage. The phase voltages have a predetermined profile, in which the voltage at the start, in the middle and at the end of a driving phase is in each case equal to zero for a predetermined time interval. During an operating phase, in which the phase voltages are not equal to zero, a traveling electromagnetic field is induced in the primary part with the aid of the field winding, said primary part interacting with the secondary part and driving said secondary part. During a time interval in which a phase voltage is equal to zero, a measurement phase is introduced, in which the phase terminals of the field winding are connected to measured signal inputs of an analog-to-digital converter via a switch arrangement, in order to measure the back-emf induced in the field winding. At the beginning of each measurement phase, there is initially a delay until an overshoot of the winding current has decayed to a sufficient extent. Then, in each case two measured values for the back-emf are detected, from which a microprocessor determines the time of the zero crossing of the back-emf by means of interpolation. The microprocessor determines the angular difference between the phase angle of the field current and that of the back-emf from the time of the zero crossing. This angular difference corresponds to the relative position between the primary and secondary parts.

The method has the disadvantage that there is initially a delay in each measurement phase before the overshoot of the winding current has decayed in order that the back-emf can be measured with a sufficient degree of accuracy at all. The time constant which is critical for the decay of the overshoots is approximately in the range of a few milliseconds in conventional electric motors. Another unfavorable factor is the fact that in each case two measured values need to be measured for the back-emf in each measurement phase, with said values needing to be spaced so far apart from one another in time that the zero crossing of the field current can be determined by interpolation of these measured values. The duration of the measurement phase therefore needs to be selected to be relatively long. During this time period, however, the electric motor is not yet being driven, i.e. the torque profile is irregular. This reduces the power and efficiency of the electric motor. In addition, the ripple superimposed on the torque can result in audible interference. A further disadvantage of the method consists in that the interpolation is associated with a certain degree of computation complexity and involves inaccuracies.

The object is therefore to provide a method of the type mentioned at the outset which provides the possibility of motor running which is as regular as possible and in which the angular difference between the phase angle of the field current and that of the back-emf can nevertheless be determined in a simple manner with a high degree of precision.

According to the invention, this object is achieved in that, once the phase voltage has been disconnected, the winding current in the winding phase for which the phase voltage has been disconnected is conducted via at least one freewheeling element having a nonlinear characteristic and is maintained, and in that an edge occurring at the zero crossing of the winding current flowing in this winding phase is detected in the winding voltage and acts as trigger signal for the measurement of the induced back-emf of the relevant winding phase.

This makes it possible to detect the time of the zero crossing of the winding current in a simple manner and with a high degree of precision. Directly after the measurement of the back-emf, the operating phase can be resumed and the electric motor supplied with current via the output stage. The measurement phase is preferably introduced shortly before the zero crossing of the winding current, with the result that the back-emf can then be measured immediately. The method according to the invention makes it possible to select the measurement phases to be very short, with the result that the torque is applied to the electric motor virtually without any interruptions. The electric motor thus provides the possibility of a high degree of efficiency and regular motor running. The electric motor is preferably a brushless DC motor. The freewheeling element can be, for example, a voltage-dependent resistor (VDR).

It is advantageous if the freewheeling element is a semiconductor diode. The semiconductor diode can in this case be integrated at low cost in the semiconductor chip of the semiconductor switch associated therewith.

In a preferred configuration of the invention, the field currents associated with the individual winding phases and/or the variable mean values thereof preferably have an approximately sinusoidal profile, wherein the phase voltages applied to the field winding are correspondingly pulse-width-modulated. By virtue of the sinusoidal driving of the field winding, a uniform torque and thus particularly smooth motor running of the electric motor can be achieved. The pulse width modulation permits driving of the field winding with low losses.

In an advantageous embodiment of the invention, once a first phase voltage applied to a first output terminal of the output stage has been disconnected, the winding current of the disconnected winding phase is conducted via a first freewheeling element in the forward direction, wherein a forward voltage occurs as a voltage drop across the freewheeling element, and wherein the influence of the forward voltage on the voltage applied to the relevant winding phase is compensated for by varying at least one second phase voltage applied to at least one second output terminal. In this case, the compensation is preferably performed in such a way that the pulse-no-pulse ratio of the phase voltages for the winding phases in which the winding current has not been disconnected is altered in such a way that the voltage rise brought about by the forward voltage at the disconnected winding phase is suppressed. This measure makes it possible to avoid a disruptive change in the field current.

It is advantageous if, during the measurement of a back-emf applied to a winding phase, the switching states of the semiconductor switches provided for driving the other winding phases of the field winding are maintained. This makes it possible to avoid a situation in which interference which can occur in the event of a change in the switching states of a semiconductor switch is superimposed on the back-emf. In the case of an electric motor with a three-phase field winding, a first phase terminal of the field winding at a high resistance, a second phase terminal at a supply voltage potential and a third phase terminal at ground potential can be connected during the measurement, for example.

In a preferred configuration of the invention, setpoint value signals are generated for the phase voltages, wherein the setpoint value signals are compared with actual value signals for the phase voltages which are applied to the output terminals, and wherein, in the event of the occurrence of a discrepancy between the setpoint value signals and the actual value signals during the operating phase(s), the driving of the field winding is altered with the aim of reducing the discrepancy. That is to say that the setpoint value signals are applied to the field winding via a control loop. It is thus possible to at least partially compensate for disruptive changes in the field current which occur as a result of a winding phase being disconnected and/or a switching state of a semiconductor switch being maintained during a measurement phase, once the measurement phase has ended. It is thus possible for at least one pulse phase of a phase voltage applied to the relevant winding phase to be extended, for example once a winding phase has been reconnected, in order to make up for at least one "lost" pulse which actually needed to have been output to the winding phase during the disconnection phase of the winding phase.

Expediently, the back-emf(s) to a neutral point of the field winding and/or a virtual neutral point is/are measured. The virtual neutral point can in this case be simulated by a resistance network, for example. Thus, the back-emf to the potential applied to the neutral point of the field winding can be measured without the neutral point at the electric motor being accessible.

It is advantageous if, in one measurement phase, at least two measured values for the back-emf of a winding phase are measured, if, when each measured value is detected, different electrical potentials are output in each case to the output terminals for the remaining winding phases, and if the switching states of the semiconductor switches connected to these output terminals are selected, when a first measured value is detected, inversely to the switching states held by the semiconductor switches when a second measured value is detected. The mean value can then be formed from the two measured values, as a result of which the influence of tolerances of the semiconductor switches, the resistors of the virtual neutral point and/or the impedances of the winding phases of the field winding, for example, on the back-emf is compensated for.

In an advantageous embodiment of the invention, the pulse-width modulations of the phase voltages for the winding phases at which the back-emf is not measured during a measurement phase are performed with a phase shift with respect to one another, preferably with a phase shift of half a cycle. As a result, EMC interference which can occur in the measurement signal for the back-emf during switchover of the semiconductor switches can be weakened.

It is advantageous if the clock frequency of the pulse width modulation is increased in each case prior to the introduction of a measurement phase. This measure also makes it possible to reduce EMC interference in the measurement signal for the back-emf.

Expediently, the pulse width modulation of the phase voltages is altered depending on an operating voltage fed to the output stage in such a way that the influence of fluctuations in the operating voltage on the field current is at least partially compensated for. In this case, in the event of a decrease in the operating voltage, the pulse width of the phase voltages is correspondingly increased and, in the event of an increase in the operating voltage, this is reduced. As a result, even more regular motor running can be achieved.

In a preferred configuration of the method, the time which passes after detection of a zero crossing of the winding current is measured and compared with a reference value, wherein a further measurement phase is introduced depending on the result of this comparison. In this case, the reference value can correspond to the time interval between two successive earlier zero crossings or can be determined from the times of more than two earlier zero crossings.

In another embodiment of the invention, the winding current is measured and is compared with a comparison value, wherein a further measurement phase is introduced depending on the result of this comparison. The further measurement phase can be started, for example, when the winding current decreases in value and the predetermined reference value is reached, or the absolute value of this is undershot.

Figure 2:
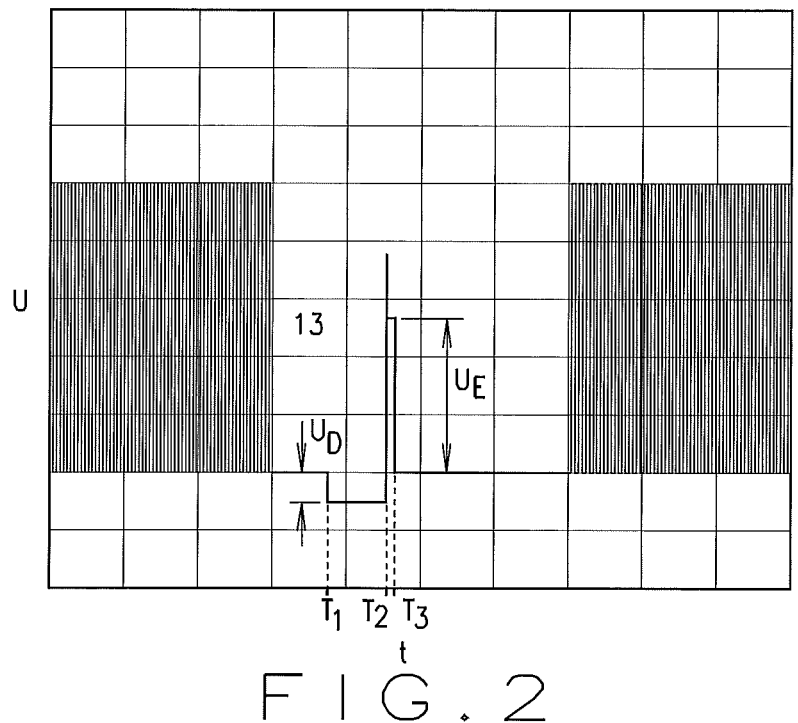
Figure 3:
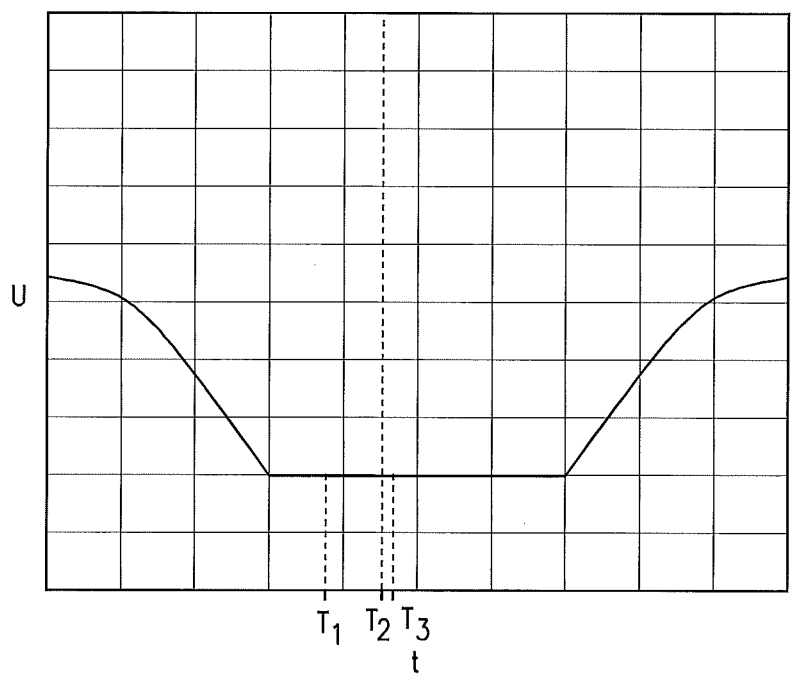
Figure 4:
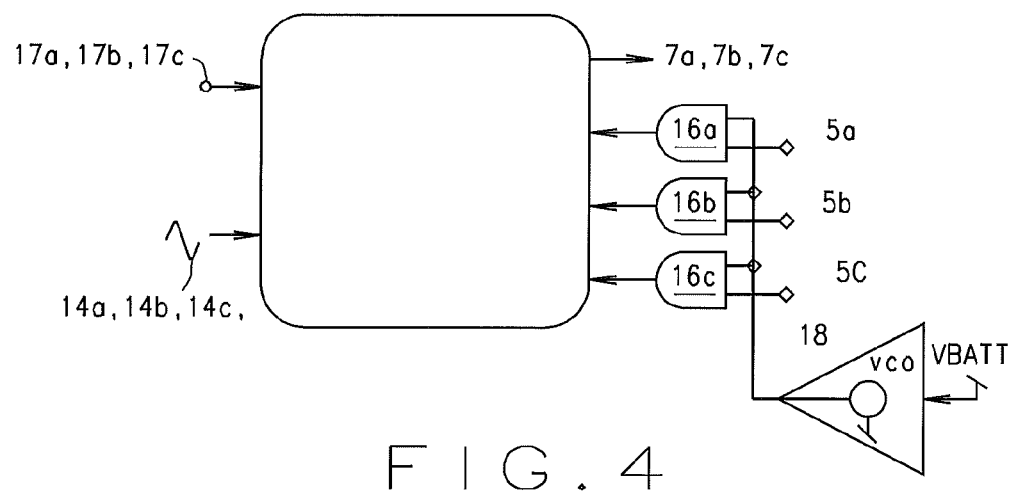
Figure 5:
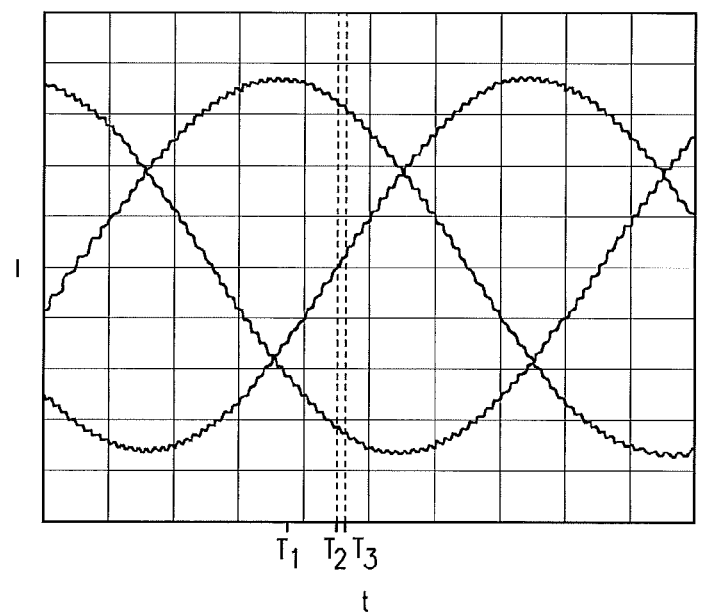

An exemplary embodiment of the invention will be explained below in more detail with reference to the drawing, in which:

FIG. 1 shows a circuit diagram of a brushless DC motor, the field winding of which can be driven via an output stage, the output stage merely being illustrated partially, FIG. 2 shows a graphical representation of a pulse-width-modulated phase voltage applied to a phase terminal of the field winding, with the time t being plotted on the x axis and the voltage U being plotted on the y axis, FIG. 3 shows a graphical representation of a mean phase voltage corresponding to a phase voltage illustrated in FIG. 2, with the time t being plotted on the x axis and the voltage U being plotted on the y axis, FIG. 4 shows a circuit for generating a pulse width modulation signal for driving a brushless DC motor, and FIG. 5 shows a graphical representation of the winding currents flowing in the winding phases of the field winding, with the time t being plotted on the x axis and the current I being plotted on the y axis.

In a method for operating an electric motor, a brushless DC motor (which is illustrated merely schematically in the form of an equivalent circuit diagram in FIG. 1) is provided as electric motor 1. The electric motor 1 has a primary part and a secondary part, which is mounted such that it is capable of rotating relative to said primary part about an axis of rotation. The primary part is in the form of a stator and the secondary part is in the form of a rotor. However, the electric motor can also be a linear motor.

The primary part has a polyphase field winding, which has three winding phases $2a$, $2b$, $2c$, which are each connected with one of their ends to a neutral point 3 and with the other of their ends to a phase terminal $4a$, $4b$, $4c$, passed out of the electric motor 1. Each phase terminal $4a$, $4b$, $4c$ is connected to in each case one output terminal $5a$, $5b$, $5c$ of an output stage 6 (only illustrated partially in the drawing). The secondary part has permanent-magnet poles, which are spaced apart from one another in the circumferential direction.

The output stage 6 has controllable semiconductor switches for applying phase voltages to the phase terminals 4a, 4b, 4c, said semiconductor switches each having a first control input 7a, 7b, 7c, which is connected to a drive device (not illustrated in any more detail in the drawing) for applying a first control signal. In each case two semiconductor switches which are connected to one another to form a half-bridge are associated with each output terminal 5a, 5b, 5c. Depending on the first control signal, the output terminals 5a, 5b, 5c can be connected either to a supply voltage potential $V_{Batt}$ or to ground potential with the aid of the semiconductor switches. In this case, a saturation voltage occurs as a voltage drop across the respectively conducting semiconductor switch.

The output terminals 5a, 5b, 5c associated with the individual winding phases 2a, 2b, 2c are each connected to a bridge output 9a, 9b, 9c of the half-bridge, said bridge output being associated with the relevant winding phase 2a, 2b, 2c, via a controllable interrupter 8a, 8b, 8c. Each interrupter 8a, 8b, 8c has in each case one second control input 10a, 10b, 10c, which is connected to the drive device for applying a second control signal. Each phase terminal 4a, 4b, 4c can be connected to the bridge output 9a, 9b, 9c of the half-bridge associated with the phase terminal 4a, 4b, 4c or isolated therefrom, in each case with the aid of the interrupter 8a, 8b, 8c associated with said phase terminal, depending on the second control signal.

FIG. 1 shows that each output terminal 5a, 5b, 5c of the output stage 6 is connected to a supply voltage terminal having the supply voltage potential $V_{Batt}$ via a first freewheeling element 11a, 11b, 11c and to a ground potential terminal via a second freewheeling element 12a, 12b, 12c. The freewheeling elements 11a, 11b, 11c, 12a, 12b, 12c provided are semiconductor diodes which are polarized in such a way that they turn off when the electrical potential at the output terminal 5a, 5b, 5c is between the ground potential and the supply voltage potential $V_{Batt}$. When the freewheeling elements 11a, 11b, 11c, 12a, 12b, 12c are energized in the forward direction, a forward voltage $U_D$ is produced as a voltage drop across said freewheeling elements.

If the potential at the output terminal 5a, 5b, 5c is greater than the sum of the supply voltage potential $V_{Batt}$ and the forward voltage, the first freewheeling element 11a, 11b, 11c associated with the relevant output terminal 5a, 5b, 5c is switched on. If the potential at the output terminal 5a, 5b, 5c is less than the negative value of the forward voltage, the second freewheeling element 12a, 12b, 12c associated with the relevant output terminal 5a, 5b, 5c is switched on.

In the method according to the invention, initially a first operating phase is run in which pulse-width-modulated phase voltages are applied to the output terminals 5a, 5b, 5c of the output stage 6 with the aid of the semiconductor switches in such a way that a rotating or traveling magnetic field is induced in the field winding, and this field brings about a relative movement between the primary part and the secondary part (FIG. 2). During the pulse width modulation, the output terminals 5a, 5b, 5c are connected alternately to the supply voltage potential $V_{Batt}$ and the ground potential, with the pulse-no-pulse ratio being varied. The pulse width modulation of the phase voltages is in this case selected such that approximately sinusoidal winding currents arranged in each case with a 120° phase shift with respect to one another flow through the winding phases. Alternatively, it is also possible for the field winding to be block-comminuted during the first operating phase. During the first operating phase, the frequency of the winding currents increases slowly until runup of the electric motor 1, until the relative speed between the primary part and the secondary part has reached a predetermined speed value. The voltage profile resulting from the pulse width modulation at a first winding phase is illustrated in FIG. 3.

An estimated value for a time $T_1$ is determined using the phase angle of the winding currents, this time being the time at which the zero crossing of the winding current in a first winding phase 2a is imminent.

As soon as the time $T_1$ has been reached, a first measurement phase is introduced by virtue of the signal level of the second control signal applied to the second control input of a first interrupter 8a is altered in such a way that the first interrupter 8a opens. As a result, the first winding phase 2a is switched at a high resistance.

Once the interrupter has opened at time $T_1$, initially the winding current in the first winding phase 2a still continues to flow via the freewheeling element 12a. In this case, the forward voltage $U_D$ is produced as voltage drop across the freewheeling element 12a. At the same time, the winding current decreases exponentially corresponding to the time constant L/R. In this case, L means the inductance and R means the resistance of the first winding phase 2a. As soon as the winding current in the first winding phase 2a has decayed to such an extent that there is a smaller voltage drop across the freewheeling element 12a than the forward voltage $U_D$, the freewheeling element 12a turns off.

Since it is not possible for any current to flow in the off direction via the freewheeling element 12a, the current is interrupted abruptly at the zero crossing and the voltage across the freewheeling element 12a increases suddenly. FIG. 2 clearly shows the corresponding edge 13 in the back-emf. In the equivalent circuit diagram in FIG. 1, in each case one voltage source which generates the back-emf is provided for each winding phase 2a, 2b, 2c.

This edge 13 is used as trigger signal, which initiates the detection of a first measured value for the back-emf. In order to detect the measured value, the first phase terminal 4a is connected to a voltmeter (not illustrated in any more detail in the drawing). The measured value detection is performed once the acicular voltage peak has decayed at time $T_2$ between the times denoted by $T_2$ and $T_3$ in FIG. 2.

During the measurement phase, the phase terminal 4b of a second winding phase 2b is connected to the supply voltage potential $V_{Batt}$ and the phase terminal 4c of a third winding phase 2c is connected to ground potential.

The phase terminal 4b of the second winding phase 2b is now connected to ground potential and the phase terminal 4c of the third winding phase 2c is now connected to the supply voltage potential $V_{Batt}$. Once any EMC interference which has been caused by the switching operations of the corresponding semiconductor switches has decayed, a second measured value for the back-emf is detected. In order to compensate for any component tolerances of the semiconductor switches, the mean value is formed from the first and second measured values. The angular difference between the phase angle of the field current and that of the back-emf is determined from the thus obtained back-emf measured value $U_G$ and previously known characteristics for the electric motor.

As soon as the second measured value has been detected, a second operating phase is run after time $T_3$, in which pulse-width-modulated phase voltages are applied to all three phase terminals 4a, 4b, 4c again in such a way that a rotating or traveling magnetic field is induced in the field winding, and this field brings about a relative movement between the primary part and the secondary part. During the pulse width modulation, the output terminals 5a, 5b, 5c are alternately connected to the supply voltage potential $V_{Batt}$ and the ground potential, with the pulse-no-pulse ratio being varied in such a way that approximately sinusoidal winding currents which are arranged with a phase offset of in each case 120° with respect to one another flow through the winding phases.

An estimated value for a time is determined using the previously determined phase angle and the duration of the second operating phase, said time being the time at which the zero crossing of the winding current in a second winding phase 2b is imminent.

As soon as this time has been reached, a second measurement phase is introduced by virtue of the signal level of the second control signal, which is applied to the second control input of a second interrupter 8b, being altered in such a way that the second interrupter 8b opens. The measurement procedure described above for the first winding phase 2a is now followed correspondingly for the second winding phase 2b.

The second measurement phase is followed by a third operating phase, and this is followed by a third measurement phase, in which the energizing and measurement procedure described above for the first winding phase 2a is implemented correspondingly for the third winding phase 2c.

Then, the above method steps are repeated, if necessary.

FIG. 4 shows that setpoint value signals 14a, 14b, 14c for the pulse-width-modulated phase voltages are generated and supplied to a first input of an arithmetic unit 15. The first control signals for driving the first control inputs 7a, 7b, 7c of the semiconductor switches are generated in the arithmetic unit 15 from the setpoint value signals. The arithmetic unit 15 can be integrated in an ASIC, for example.

The arithmetic unit 15 has an adder and subtractor circuit. At the beginning of a new pulse width modulation cycle, initially the new setpoint value of the setpoint value signal 14a, 14b, 14c is added to the meter count of the adder and subtractor circuit. The analog signal, which corresponds to the digital setpoint value signal 14a, 14b, 14c, can have the profile illustrated in FIG. 3, for example. The pulse-width-modulated phase voltage for the field winding is generated corresponding to the setpoint value signal 14a, 14b, 14c.

The adder and subtractor circuit is used for generating the first control signals for driving the semiconductor switches. As long as the meter count of the adder and subtractor circuit is greater than zero, the supply voltage potential $V_{Batt}$ is applied to the phase terminal 4a, 4b, 4c of the winding phase 2a, 2b, 2c associated with the meter count (pulse phase).

As soon as the meter count reaches the value zero, the ground potential is applied to the phase terminal 4a, 4b, 4c of the winding phase 2a, 2b, 2c associated with the meter count (no-pulse phase).

During the current cycle, the setpoint value signal 14a, 14b, 14c can be matched by addition or subtraction of correction values. The correction values are supplied to the adder and subtractor circuit via a correction value input 17. As a result, drive errors which occur as a result of the absence of pulse width modulation during a measurement phase, for example, can be corrected once the relevant measurement phase has come to an end.

As can be seen from FIG. 4, the time clock for the decrementing of the meter count is generated with the aid of a voltage-controlled oscillator 18. The clock frequency of the time clock is proportional to the supply voltage potential $V_{Batt}$. The time clock applied to the output of the voltage-controlled oscillator 18 is supplied to a first input of an AND gate 19.

The signal applied to the output terminal 5a, 5b, 5c of the output stage 6 is applied to a second input of the AND gate 19 if the electrical potential at the output terminal 5a, 5b, 5c corresponds to half the supply voltage potential $V_{Batt}/2$, for example. This has the advantage that switch-on and switch-off delays for the power transistors are automatically compensated for.

FIG. 5 illustrates the currents in the winding phases 2a, 2b, 2c. Initially, the currents in the winding phases 2a, 2b, 2c have been illustrated without the measurement phases in the case of driving of the field winding for comparison purposes. Then, the currents for the driving according to the invention of the field winding with the measurement phases were recorded and superimposed on the first-mentioned currents. As can be seen, the current discrepancies resulting from the measurement phases are very low. The interruption in the current can be seen at the time interval between $T_2$ and $T_3$ in the center of FIG. 5. Disruptive effects which were not completely eliminated can be seen in FIG. 5 between $T_1$ and $T_3$ in the upper and lower measurement signal.

Mention should also be made of the fact that the setpoint value signal 14a, 14b, 14c is generated with the aid of a microprocessor, which in each case outputs a new setpoint value in the case of an interrupt.

It is easily possible with the aid of the arithmetic unit 15 to determine intermediate values by means of linear interpolation of the setpoint values of the digital setpoint value signals 14a, 14b, 14c. This has the advantage that an operating program running on the microprocessor needs to be interrupted less often by interrupts. For example, in each case two setpoint value additions can be performed for each pulse width modulation cycle, with a preceding setpoint value being added in a first step and a new setpoint value being added in a second step for a first pulse width modulation cycle. For a second pulse width modulation cycle, on the other hand, the new setpoint value is added in the first and second steps. Then, the scenario is repeated by virtue of in each case alternately the preceding and the new setpoint value being added. It is also possible to determine more than one intermediate value with the aid of the interpolation.

The clock frequency of the oscillator 18 can be greater than the clock frequency with which the interrupt is generated. Preferably, the clock frequency of the oscillator 18 is a multiple of that of the interrupt, and the individual setpoint values are output a plurality of times. The clock frequency of the interrupt can be approximately 20 kHz and that of the oscillator 18 can be approximately 40 kHz, for example. The profile of the setpoint value signal 14a, 14b, 14c does not necessarily need to be sinusoidal. Instead, other signal forms are also conceivable, for example a square-wave and/or trapezoidal signal form.

The invention claimed is:

1. A method for operating an electric motor, which has a primary part and a secondary part, the primary part having a polyphase field winding having winding phases, the phase terminals of said field winding each being connected to an output terminal of an output stage, the output stage having controllable semiconductor switches for applying phase voltages to the output terminals, said method comprising the following steps:
    a) introducing an operating phase by applying the phase voltages to the output terminals of the output stage in such a way that a traveling magnetic field is induced in the field winding which causes a relative movement between the primary part and the secondary part,
    b) disconnecting the phase voltage at least one of the output terminals in order to introduce a measurement phase, wherein once the phase voltage has been disconnected, the winding current in the winding phase for which the phase voltage has been disconnected is conducted and maintained via at least one freewheeling element having a nonlinear characteristic, c) measuring the electrical back-emf which is induced in the winding phase connected to this output terminal as a result of the relative movement between the primary and secondary parts in order to determine the angular difference between the phase angle of the field current and that of the back-emf, d) characterized in that, an edge in the winding voltage which occurs during the zero crossing of the winding current flowing in said winding phase is detected and acts as a trigger signal for the measurement of the induced back-emf of the relevant winding phase, in that once an acicular voltage peak has decayed, a voltage of the back-emf is measured, and in that an angular difference between the phase angle of the field current and the phase angle of the back-emf is determined from the measured voltage of the back-emf and previously known characteristic variables for the electric motor.

2. The method as claimed in claim 1, wherein the freewheeling element is a semiconductor diode.

3. The method as claimed in claim 1, wherein the field currents associated with the individual winding phases and/or the variable mean values thereof have an approximately sinusoidal profile, and in that the phase voltages applied to the field winding are correspondingly pulse-width-modulated.

4. The method as claimed in claim 1, wherein, once a first phase voltage applied to a first output terminal of the output stage has been disconnected, the winding current of the disconnected winding phase is conducted via the first freewheeling element in the forward direction, in that, in the process, a forward voltage occurs as a voltage drop across the freewheeling element, and in that the influence of the forward voltage on the voltage applied to the relevant winding phase is compensated for by varying at least one second phase voltage applied to at least one second output terminal.

5. The method as claimed in claim 1, wherein, during the measurement of a back-emf applied to one of the winding phases, the switching states of the semiconductor switches provided for driving the other winding phases of the field winding are maintained.

6. The method as claimed in claim 1, wherein setpoint value signals are generated for the phase voltages, in that the setpoint value signals are compared with actual value signals for the phase voltages which are applied to the output terminals, and in that, in the event of the occurrence of a discrepancy between the setpoint value signals and the actual value signals during the operating phase, the driving of the field winding is altered with the aim of reducing the discrepancy.

7. The method as claimed in claim 6, wherein the setpoint value signals are provided as time-discrete signals, which each have at least two setpoint values associated with different points in time, in that in each case at least one intermediate value for the setpoint values of the individual phase terminals is interpolated, and in that the setpoint values and the at least one intermediate value are each compared with an actual value for the phase voltages which is applied to the output terminals and, in the event of the occurrence of a discrepancy during the operating phase, the driving of the field winding is altered with the aim of reducing the discrepancy.

8. The method as claimed in claim 1, wherein the back-emf to a neutral point of the field winding is.

9. The method as claimed in claim 1, wherein, in one measurement phase, at least two measured values for the back-emf of one of the winding phases are measured, in that, when each measured value is detected, different electrical potentials are output in each case to the output terminals for the remaining winding phases, and in that the switching states of the semiconductor switches connected to these output terminals are selected, when a first measured value is detected, inversely to the switching states held by the semiconductor switches when a second measured value is detected.

10. The method as claimed in claim 1, wherein the pulse-width modulations of the phase voltages for the winding phases at which the back-emf is not measured during a measurement phase are performed with a phase shift with respect to one another.

11. The method as claimed in claim 10, wherein the pulse-width modulations of the phase voltages for the winding phases at which the back-emf is not measured during a measurement phase are performed with a phase shift with respect to one another of half a cycle.

12. The method as claimed in claim 1, wherein the clock frequency of the pulse width modulation is increased in each case prior to the introduction of a measurement phase.

13. The method as claimed in claim 1, wherein the pulse width modulation of the phase voltages is altered depending on an operating voltage fed to the output stage in such a way that the influence of fluctuations in the operating voltage on the field current is at least partially compensated for.

14. The method as claimed in claim 1, wherein the time which passes after detection of a zero crossing of the winding current is measured and compared with a reference value, and in that a further measurement phase is introduced depending on the result of this comparison.

15. The method as claimed in claim 1, wherein the winding current is measured and is compared with a comparison value, and in that a further measurement phase is introduced depending on the result of this comparison.

16. The method as claimed in claim 1, wherein steps a) to c) are repeated.

17. The method as claimed in claim 1, wherein the back-emf to a neutral point of a virtual neutral point is measured.

* * * * *